3 Sheets—Sheet 1.
A. W. & C. T. KENDRICK.
Fanning-Mill.
No. 215,367. Patented May 13, 1879.
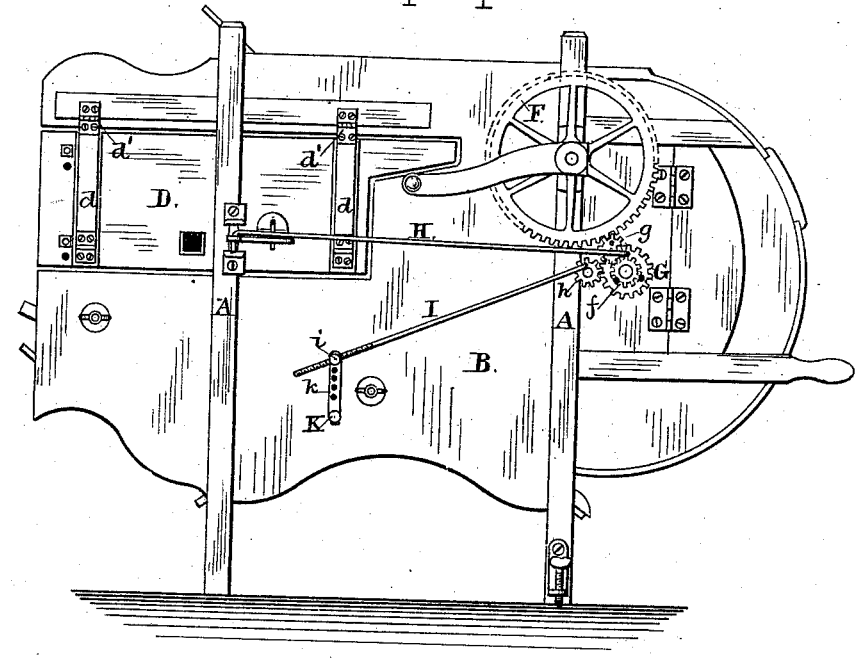
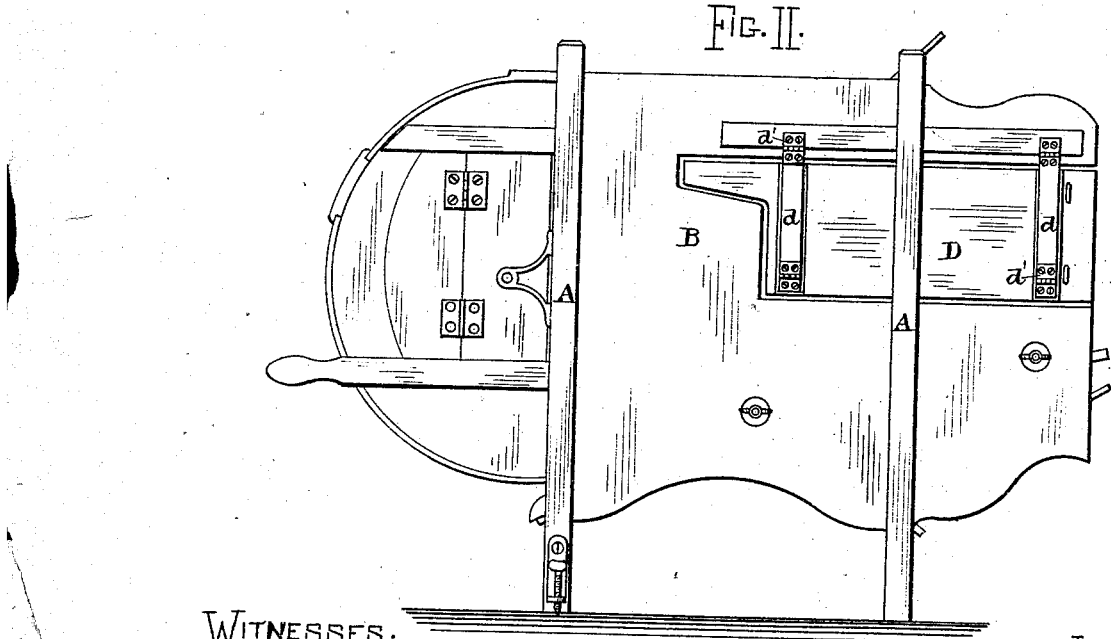
Witnesses:
D. C. Allen
B. M. Griggs.
Inventors:
Andrew W. Kendrick
Charles T. Kendrick
By Andrew W. Kendrick, Atty.

A. W. & C. T. KENDRICK.
Fanning-Mill.
No. 215,367. Patented May 13, 1879.
Fig. III.
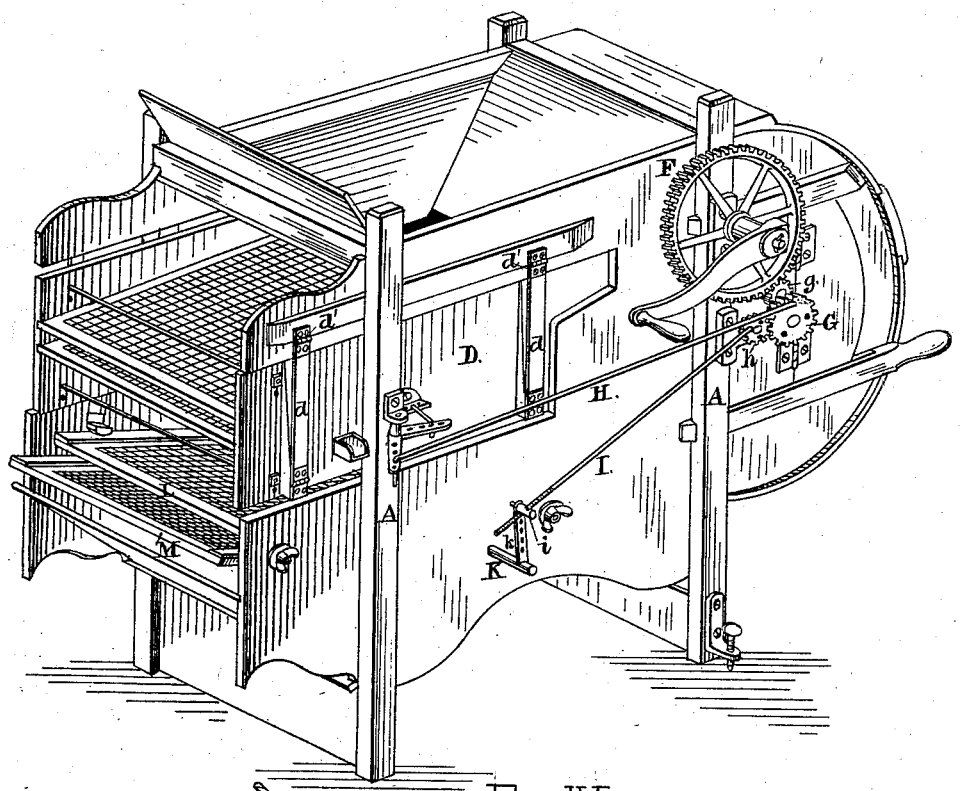
Fig. IV.
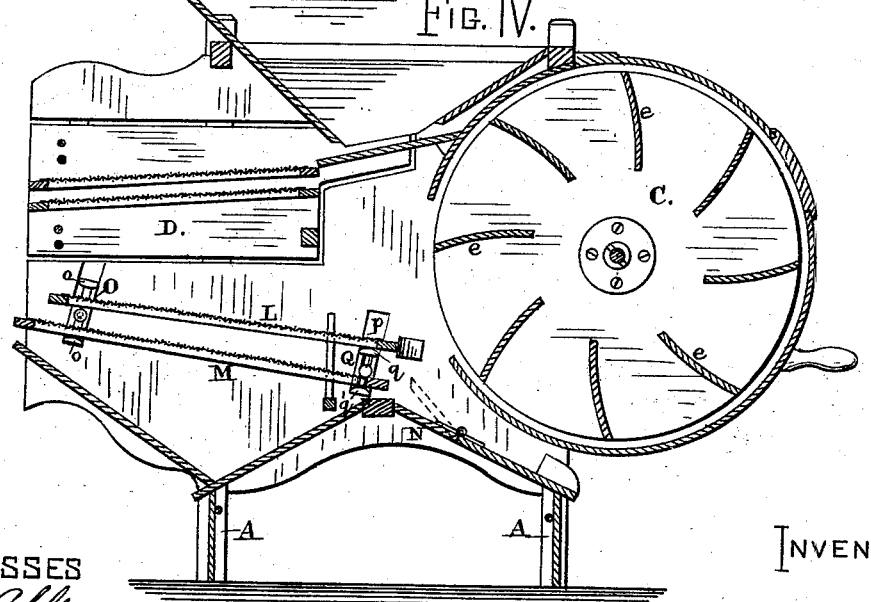
WITNESSES
D. C. Allen
B. M. Griggs.
INVENTORS
Andrew W. Kendrick
Charles T. Kendrick
By Andrew W. Kendrick, Atty 3 Sheets—Sheet 3.
A. W. & C. T. KENDRICK.
Fanning-Mill.
No. 215,367. Patented May 13, 1879.
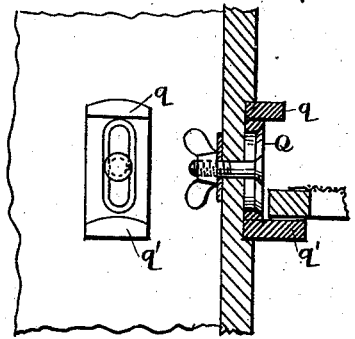
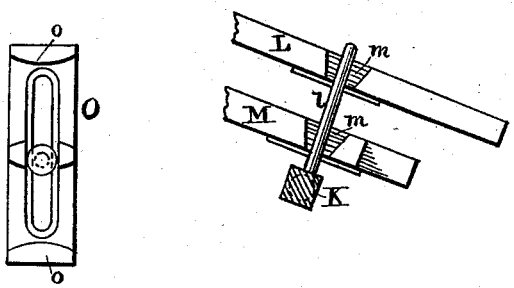
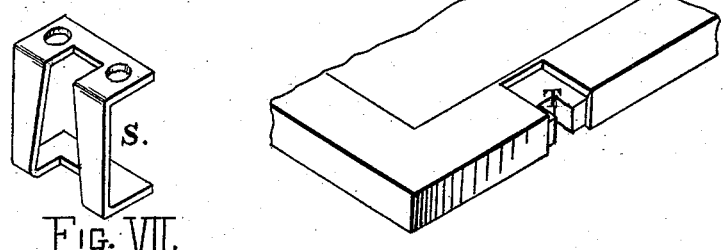
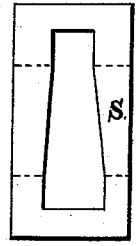
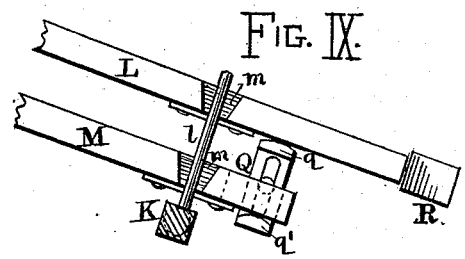
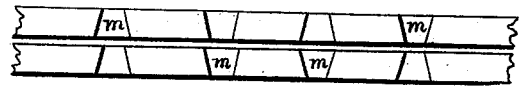
WITNESSES:
P. C. Allen
B. M. Griggs
INVENTORS:
Andrew W. Kendrick
Charles T. Kendrick
By Andrew W. Kendrick, Atty
N. PETERS, PHOTO-LITHOGRAPHER, WASHINGTON, D. C.

UNITED STATES PATENT OFFICE.

ANDREW W. KENDRICK AND CHARLES T. KENDRICK, OF BROOKLYN, N. Y.

IMPROVEMENT IN FANNING-MILLS.

Specification forming part of Letters Patent No. 215,367, dated May 13, 1879; application filed March 27, 1879.

*To all whom it may concern:*

Be it known that we, ANDREW W. KENDRICK and CHARLES T. KENDRICK, of the city of Brooklyn, in the county of Kings and State of New York, have invented certain new and useful Improvements in Fanning-Mills for Separating Grain, Seeds, and other like Articles; and we do hereby declare the following to be a full, clear, and exact description of the same, reference being had to the accompanying drawings, in which—

Figure 1, Sheet 1, is a side elevation of a machine embodying our improvements, showing the drive-wheel and the intermediate mechanism for imparting the desired movements to the shoe and lower screens. Fig. 2, Sheet 1, is an elevation of the opposite side. Fig. 3, Sheet 2, is a perspective view, showing the multiplying-gear for the shoe and screens. Fig. 4, Sheet 2, is a longitudinal vertical section of the machine, exposing the general internal arrangements and the means for actuating, supporting, and varying the movement of the lower screens. Fig. 5, Sheet 3, designates a group of two detail views—a face and a side view—of one of the lower or inner supporting-brackets for the lower screens. Fig. 6, Sheet 3, is a detail view of a portion of one side of the lower screen-frames, showing the V-shaped cut or gain made vertically in its side, to permit the introduction and free vertical or radial movement of the arm of the rock-shaft imparting motion to said screen-frames. Fig. 7, Sheet 3, is a group of two detail views, the former showing, in perspective, the reversible wearing-plate, which is detachably connected to the recessed screen-frame at the point of its engagement with each of the rocking arms, and the latter showing the form of the blank from which said plate is made, the dotted lines indicating where the plate is bent to correspond to the edges of the screen-frame. Fig. 8, Sheet 3, is a detail of the recessed part of the screen-frame, showing the form of recess and countersink made in the side bars for the reception of the reversible wearing-plate. Fig. 9, Sheet 3, is a side elevation of the two lower screens, as if the side casing of the mill were removed, showing one of the arms of the rock-shaft playing in the recesses, one of the bumpers for the lower and the upper screen, and the various adaptations to render both screens conveniently removable separately, and securely maintained in position, so as to receive and permit the nicest variations of the peculiar movement required for the kind of work performed by our machine—requisites which it has been found hard to unite in one machine. Fig. 10, Sheet 3, designates a number of possible relations of the V-recesses in the screen-frames, where a reversible wearing-plate is used for each recess in each frame.

Our invention relates more particularly to that class of grain-separators for improvements in which Letters Patent were successively granted to us on the 23d day of January, 1877, No. 186,578, and the 8th day of January, 1878, No. 198,986, and are more specially designed as improvements upon the mill shown in the latter patent.

The object of our invention is to simplify the construction, and render more expeditious and accurate the manipulation and work, of that machine; and to this end the invention consists, first, in a novel contrivance for imparting reciprocation variable as to the central line of the "throw" to the lower or "long" screens, the construction of said device lessening the tendency to work loose, and thereby vitiate the operation of said screens upon the material treated, and also facilitating adjustment; secondly, in a peculiar construction of the screen-frames in relation to the operating rock-shaft, which permits their relative movement; thirdly, in the combination of two screens, the lower one of finer mesh and the upper one of coarser mesh, and arranged to deliver the material passing through it directly upon the lower screen, said screens being operated from below by a rock-shaft provided with arms, and having their frames arranged to slide in guides, whereby the two screens have a synchronous rectilinear reciprocation, the upper one having the greater throw, for reasons hereinafter more fully set forth; fourthly, in combination of the rock-shaft provided with arms, the screens having side bars recessed, the inner or lower screen-supports cut away to receive the lower screen, and the upper or outer screen-supports serving to prevent the upper ends of the screens from bouncing, whereby the arms of the rock-shaft serve the additional function of keys or bolts to prevent the slipping of the screens out of place longitudinally, and the outer screen-supports are made to aid in the application or removal of the screens; fifthly, in the combination of the rock-shaft having arms, the screen or screens having recessed sides, the projecting inner or lower screen-supports, and the bumpers attached to the mill at a point beyond the said screen-supports, whereby the bump or jar at the termination of the forward or inward movement of the lower screens is preserved consistently with the greater throw of the upper screen; sixthly, in the combination, with a rock-shaft having an arm or arms, of a screen-frame and one or more plates or blocks formed with wedge-shaped recesses, and adapted to be detached therefrom and applied thereto in either of two reverse positions, for the purpose of altering the length of reciprocation of said screen-frame; seventhly, in the peculiar construction of the wearing-plates and of the screen-frame in relation thereto.

A A are the uprights of the mill, to which is secured the casing B. C is the fan-case. D is the shoe, suspended by straps $d$, connected at either end to the casing and the shoe by hinges $d'$, by which a perfectly free motion is obtained for the shoe transversely to the mill, and all oblique or longitudinal movement—as, for instance, in the insertion or withdrawal of the sieves or nests of sieves—is obviated.

Inasmuch as the shoe and fan in the present application need have no novel peculiarities as distinguished from the ones shown in the patent of January 8, 1878, before referred to, and that of the patent granted to us January 23, 1877, it will not be necessary to describe them particularly.

As to the shoe, the interchangeable systems of nests and single sieves, such as is well known and understood in the art, (see, for example, Patent No. 186,578, hereinbefore referred to,) will be employed according to the exigencies of each particular case. It should be remarked, however, touching the construction of the fan or central disk, that the line of the fan-blades in cross-section is nearly or quite an arc of a circle of the same radius as that of the entire disk, and that the blades are so set that this arc, if produced, would nearly or exactly intersect the center of the fan-shaft. The blast thus is thrown off in a line as nearly as possible radial to the blades and tangential to the circle of the fan.

The driving crank-wheel F engages with a multiplying-pinion, $f$, on the fan-shaft through an intermediate pinion, $g$, mounted on the bracket supporting this end of the fan-shaft. On the end of the shaft, outside of the pinion $f$, is a crank-pinion, G, of twice the diameter in this particular case, although the relative proportions of the greater and the less may, of course, be varied within certain limits. Pinion G is provided with adjustment-holes, as shown, for the connection of pitman H, which, through an adjustable elbow-lever and link, connected to the shoe in the well-known manner, imparts a transverse reciprocation. The crank-pinion G drives a smaller crank-pinion, $h$, through a pitman, I, imparting to the lower or long screens a greatly-accelerated motion (compared with that of the shoe) through a rock-shaft, K. Pitman I is screw-threaded at its lower end for the reception of a nut, $i$, which has a pivot-pin formed upon it, which engages a slot or adjustment-hole in the rigid arm $k$ of the rock-shaft K, and is permitted free pivotal movement therein. A nut or pin prevents it becoming detached. It is obvious that its connection to rocking arm $k$ prevents its turning upon the screw-threaded pitman I. The adjustment of this nut back and forth upon the pitman moves the lower screens back and forth with reference to the bumpers and the fan; and as the upper or coarser, owing to its relative position, (see drawings,) acts at its upper and outer end as a divider, its adjustment relative to the fan modifies the grading, according as more or less of the light and heavy matters descending through the blast are blown over or fall within the upper edge of the screens.

These screens L M are recessed at each side with V or Λ formed gains or recesses $m\ m$, which, according to their simpler form, are cut in the edges of the side bars, T, and armed with wearing-plates S at the narrowest side of the cut. The V form allows the radial movement of the rigid arms $l\ l$, preferably two, one at each side, and projecting up through the recesses $m$. The arms $l\ l$ are perfectly smooth and uniform in diameter, and admit of partial or complete insertion or withdrawal while fitting the narrowest part of the recesses $m$ to prevent loss of motion.

In order to render this rock-shaft capable of being readily applied or withdrawn after the mill has been "set up," it may be cast or otherwise made in two substantially similar pieces, each carrying one of the arms $b$. The adjacent ends of these two halves are readily united by a pin, screws, rivets, or bolts after being inserted through the opposite sides of the mill.

Of the screens L M, the upper one or grader, L, upon which the grain descends through the blast in showers from the sieves of shoe D, is the coarser. The blast causing the grain to strike the screen in lines nearly vertical to its plane, it is indispensable that it should have an exceedingly rapid motion, to prevent the meshes from clogging and the sheet of material flowing down it from becoming irregular or interrupted. At the same time its motion should be parallel to its plane, so that the grain is kept incessantly sliding and dancing down it. This screen separates the largest and plumpest grains—the seed or No. 1 wheat, which passes over the lower end, and over the divider N, and out in front of the mill; or, as in our patent of January 8, 1878, referred to, the divider N may be dropped, and the best wheat run together with the second grade—market wheat—from the tail of the lower screen, M. This screen (finer than the upper one) grades the material passing through the latter, separating the second grade from cockle, chess, &c. The true reciprocation of both these screens in a right line coincident with their planes, when they both occupy the positions shown, is secured at the upper or outer end by means of slotted supporting-brackets O, having holding or confining lugs o, and countersunk in the sides of the mill in recesses p, which are longer than the brackets, for the purpose of moving them up and down to vary the inclination of the screens or their height as dividers of the material in common with the blast. The inner ends of the screens are upheld by slotted brackets Q, somewhat different in form and function, as they are not intended to confine the screens down.

With a view to causing the lower screen a sudden stoppage or bump at the termination of each of its movements in the direction of flow of the material, it projects considerably from the surface of the casing, while the screen is recessed or shouldered in a manner substantially similar to the lower screens of our former patents, and, like them, may be provided with metallic face-plates. It is adjusted by a thumb-screw, and its small guide-lugs at the back projecting into a gain in the casing.

The lug q at the top of bracket Q is very much shorter than the supporting-lug q', and permits the recessed side of the screen to pass it freely.

Lug q is only a slightly-extended bearing or rest for the upper screen, L, for which purpose it is rounded slightly, as shown, on the upper face, as is the case with the upper face of the lug q'. The adjacent faces of top and bottom lugs o of brackets O are also made convex, to permit the tipping of the screen on them as a fulcrum.

To apply the lower screen, it is shoved in between the middle and bottom lugs of brackets O, being kept raised until it has reached the proper point for its lower end to drop between brackets Q on lugs q', when it permits the arms l l of the rock-shaft to find their way up through the recesses. The rock-shaft thus secures it from longitudinal displacement, and thus answers the additional purpose of a locking-pin, (such as is shown in our former patents referred to.) The lugs of brackets O confine its upper end from jumping, while gravity and the V shape of the recesses insure its true rectilinear reciprocation. The upper screen is similarly introduced, except that its lower end, being of full width, and projecting beyond that of screen M, rests upon the top of bracket q', and a separate bumper, R—a wooden block, for instance—is nailed to the casing.

It will be observed that the relative positions of the two screens and the arms of rock-shaft K—that is, at different distances from the axis of oscillation—cause the upper screen, while moving synchronously with the lower one, to have a greater throw, a more abrupt stoppage against the bumpers R, and consequently a more violent agitation and rapid flow of the material, than is the case with the lower screen, M. The difficulties obviated by this differential motion are these: Under the old arrangements the upper and lower screens, being held rigidly together, receive the same motion, which, owing to the differences of the work to be performed by these screens, was, when adjusted for the one, too gentle or too violent for the other. If the upper screeo r "grader" is not given sufficient throw, the meshes will choke with the grain, which descends in showers almost or quite endwise upon the upper screen or grader in lines which, owing to the blast, are nearly vertical thereto, and consequently tend to plunge endwise into the meshes and choke it. Experience has confirmed us in the belief that the only method of preventing this choking of the meshes is to impart a motion of such intense rapidity as to knock the grains obliquely ere they can possibly descend into the mesh, and compel them to assume a position more or less nearly parallel to the screen, and then in this position to utilize their momentum by causing the screen a sudden stoppage and jar just as it is carried in the direction of the natural flow of the grain. The rectilinear movement in the line of the plane of the screen is the best adapted for this purpose. Were the line of either the movement or the bump oblique to the plane of the screen, it would cause the grain to jump and to be unevenly distributed, and a large quantity of objectionable matters would escape into the best grade. If, on the other hand, (in the machines where both screens are rigidly held together,) sufficient motion is given to the upper screen to enable it to rid itself promptly and cleanly of the best wheat, and yet eliminate inferior and deleterious matters, the lower and finer screen will be agitated too violently, causing the material on it to bounce, and the cockle, chess, and other impurities, instead of escaping through the meshes, will bound down over the lower end into the second or "market" grade of wheat.

The rapidity of vibration can scarcely be rendered too great; but the difference in mesh, the different manner of delivery of the grain on the surfaces, and the difference in the character of the particles to be eliminated, form conditions which enforce a longer throw for the upper screen and an equally rapid but gentler movement for the lower one.

If, in cleaning the smaller-grained sorts of wheat, it should be found desirable to increase the throw of the upper screen without changing that of the lower, the lower end of the upper one can be raised on its upper end bearings as a pivot, thus lengthening, mechanically, the arms *l l*, (which may be made of any suitable length for the purposes of adjustment,) and blocks or cleats may be nailed to the sides of the mill, as ways on which it may slide.

It is of course obvious that the adjustable brackets O Q may either or both be moved up or down, so that the throw of both screens may be essentially modified either with or without changing their angle of inclination. Raising the outer ends also narrows the exit-opening of the blast, and consequently concentrates it at the narrowest point of the space.

The violence of the bump of each screen, as in our former patents, is regulated by lengthening and shortening the pitman.

The pitman I may be detached from the crank-pinion *h* and turned around in the pivot-nut *i*, instead of detaching the nut itself from the rocking arm *k*.

We finally provide the screens with metallic plates at the sides, in which are formed the V-shaped recesses. The form of a blank for such a plate is illustrated in Fig. 7. The small end of the recess is the little end of the slot; thence it widens. A parallelogram represents the wide end of the recess. The dotted lines indicate the places where the metal is bent to correspond to the edges of the screen-frame, which is countersunk on the top, sides, and bottom to bring the plate "flush," so as not to obstruct the movement of the screen.

The plate may be reversed, so as to bring the narrow part of the V above or below, so that the rocking arms *m* will engage the screen at either of two points, the distance between which is equal to the thickness of the screen-frame, and making just that difference in the length, mechanically, of the rocking arms, and, consequently, in the throw of the screen, without the necessity of changing the position of the screen-brackets O Q, which would involve the accompanying adjustment of the other screen and the modification of the blast above referred to—the very things which it would be in many instances desirable to avoid.

The lower screens of our separator have usually a very short throw—from one-quarter of an inch to seven-eighths of an inch; and the most minute variations in this particular, owing to the intense rapidity of the motion, becomes important in effect.

Thus are secured two further advantages: First, the throw of screens L M relatively to one another may be changed, and one screen is prevented from moving too violently or the other from being overloaded; second, the reversible wearing-plates, in connection with the adjustable brackets, extend the adjustability of the throw up to a height, and to a degree of inclination of the screens forward and back, not attainable by means of the brackets alone.

We provide several interchangeable screens adapted to different kinds and conditions of grain or seed, to take the places of the wheat-screens, when desired.

The necessity of frequently changing the screens brings into importance our method for firmly holding them in place, and giving them true motions, at the same time that they may be applied or removed almost in an instant, and with two simple movements of the hand.

The operation has been described incidentally with sufficient clearness, as it is believed. With reference, however, to the adjustment outwardly or rearwardly of the lower screens by lengthening pitman I, it should be observed that it is desirable to do this when a stronger blast and a more rapid motion of the screens are necessary. The greater distance of the upper ends of these frames compensates in this case for the greater distance to which grain, &c., of a given grade or weight is blown. The bump or jar of the lower screens, which would become too violent with a very rapid motion, is diminished by this adjustment outwardly.

We claim as new and of our invention—

1. The combination, with the screens of a grain-separator, and a crank-shaft imparting motion thereto, of the pitman, screw-threaded at its lower end, and the nut formed with the pivot-pin engaging the crank-arm on said rock-shaft, substantially as described.

2. The combination of the rock-shaft, operating from beneath, and the screens L and M, supported one above the other independently of the rock-shaft, and formed with V-shaped recesses in their side bars, substantially as described.

3. The combination of two screens, one above the other, the upper one being of coarser mesh and the lower one of finer, said screens having their frames arranged to slide in guides, and being arranged to be operated from below by a rock-shaft provided with an arm or arms, whereby the two screens have a synchronous rectilinear reciprocating movement, the upper one having the greater throw, substantially as described.

4. The within-described combination of parts—to wit, the rock-shaft, having arms, the two screens, having recessed sides, the inner or lower screen-supports projecting from the casing, and cut away to receive the lower screen, and the upper or outer screen-supports, having holding-lugs, whereby the screens are adapted to be quickly applied and held securely in place, or expeditiously removed, substantially as described.

5. The combination of the rock-shaft, having arms, the screen or screens, having recessed sides for the rock-shaft, the projecting inner or lower screen-supports, and the bumpers attached to the mill at a point beyond the said screen-supports, whereby the bump or jar at the termination of the inward movement is preserved for both screens consistently with the greater throw of the upper screen, substantially as described.

6. The combination of a rock-shaft having an arm or arms, and a screen-frame provided with one or more plates formed with wedge-shaped recesses, and adapted to be detached therefrom and applied thereto in either of two reverse positions, for the purpose of altering the length of reciprocation of said screen-frame, substantially as described.

7. The wearing-plate having the irregularly-formed slot and double L-shaped in cross-section, said plate being adapted to be applied to or detached from a screen-frame, in the manner described, and for the purpose set forth.

ANDREW W. KENDRICK.
   CHARLES T. KENDRICK.

Attest:
 D. C. ALLEN,
 B. M. GRIGGS